United States Patent [19]

Yamamoto et al.

[11] 4,098,725
[45] Jul. 4, 1978

[54] LOW THERMAL EXPANSIVE, ELECTROCONDUCTIVE COMPOSITE CERAMICS

[75] Inventors: Hirotaka Yamamoto; Hideaki Ninomiya; Makoto Kobayashi, all of Tokyo, Japan

[73] Assignee: Tokyo Denki Kagaku Kogyo Kabushiki Kaisha, Tokyo, Japan

[21] Appl. No.: 634,150

[22] Filed: Nov. 21, 1975

[30] Foreign Application Priority Data

Nov. 28, 1974 [JP] Japan .......................... 49-136811
Sep. 9, 1975 [JP] Japan .......................... 50-109162

[51] Int. Cl.² .......................................... H01B 1/08
[52] U.S. Cl. .................................. 252/519; 252/507; 252/508; 252/509; 252/512; 252/513; 252/514; 252/516; 252/517; 252/518; 252/520; 252/521
[58] Field of Search ............... 252/518, 514, 518.1, 252/519, 520, 521.2; 106/39.6, 39.7; 29/182.5

[56] References Cited

U.S. PATENT DOCUMENTS

| | | | |
|---|---|---|---|
| 2,920,971 | 1/1960 | Stookey | 106/39.6 |
| 3,394,087 | 7/1968 | Huang et al. | 252/518 X |
| 3,441,516 | 4/1969 | Mulligan et al. | 252/518 X |
| 3,484,284 | 12/1969 | Dates et al. | 252/518 X |
| 3,615,734 | 10/1971 | Cole | 252/514 X |
| 3,625,718 | 12/1971 | Petticrew | 106/39 |
| 3,634,111 | 1/1972 | Foster et al. | 106/39 X |
| 3,725,091 | 4/1973 | Chyung et al. | 29/182.5 X |
| 3,888,796 | 6/1975 | Nigol | 252/518 |
| 3,948,812 | 4/1976 | Corren et al. | 252/518 X |

*Primary Examiner*—Benjamin R. Padgett
*Assistant Examiner*—E. Suzanne Parr
*Attorney, Agent, or Firm*—Brisebois & Kruger

[57] ABSTRACT

Low thermally expansive, electroconductive composite sintered ceramics comprised of a phase of at least one ceramics selected from the group consisting of low thermally expansive ceramics and negatively thermally expansive ceramics, having dispersed thereinto substantially in a continuous state a phase of an electroconductive substance such as a metal.

1 Claim, 6 Drawing Figures

LOW THERMAL EXPANSIVE, ELECTROCONDUCTIVE COMPOSITE CERAMICS

BACKGROUND OF THE INVENTION

The present invention relates to new ceramics possessing electroconductivity and low thermally expansive property.

Known hitherto as electroconductive ceramics are porous ceramics obtained by adding a metal fluoride to a metal diborate or a mixture of a metal diborate and a metal disilicide and sintering the resultant mixture, silicon carbide, lanthanum chromite and zirconia and the like.

However, these known electroconductive ceramics have many drawbacks. As these ceramics show a nonlinear change in electroconductivity to temperatures, thus limiting the range of applicable temperatures. Because of high thermal expansibility, these ceramics have poor thermal impact-resistance and tend to crack by rapid change of temperature. In addition, these ceramics are porous and have low mechanical strength.

As a result of various researches made for overcoming the drawbacks of these known electroconductive ceramics and for developing new type electroconductive ceramics possessing a low thermal expansion coefficient and a dense structure, it has now been found that this purpose can be attained by properly combining low thermally expansive or negatively thermally expansive ceramics with an electroconductive substance. The present invention is based on the above finding.

BRIEF SUMMARY OF THE INVENTION

In accordance with the present invention, there is provided low thermally expansive, electroconductive composite sintered ceramics composed of a phase of low thermally expansive or negatively thermally expansive ceramics having dispersed thereinto substantially in a continuous state a phase of an electroconductive substance.

It is an object of the present invention to provide low thermally expansive, electroconductive composite ceramics which are utilizable for various application over a wide range of temperatures.

It is another object of the present invention to provide electroconductive composite ceramics which are excellent in thermal impact-resistance and have a dense structure.

It is another object of the present invention to provide composite ceramics excellent in thermal impact-resistance, mechanical strength, high temperature chemicals-resistance and thermal conductivity.

It is still another object of the present invention to provide electroconductive composite ceramics useful for the production of heaters, electrodes in the field of chemical industry, instruments for removing electric charge and thermisters.

It is further object of the present invention to provide low thermally expansive composite ceramics suitable for the use encountering repeated rapid heating and cooling.

It is still further object of the present invention to provide composite ceramics useful as safe heat-generating elements which are easy in control of temperatures.

It is yet another object of the present invention to provide composite ceramics capable of radiating far infra-red heat rays and thus suitable for dehydration, evaporation of organic solvents, baking and curing of resins, drying of resins, fibers, metals and medicaments.

It is yet further object of the present invention to provide composite ceramics capable of affording ceramic heaters where the heater elements and supports thereof are integrated.

BRIEF DESCRIPTION OF THE DRAWINGS

Other and further objects, features and advantages of the present invention will be apparent from the following description taken in connection with the accompanying drawings, wherein.

DETAILED DESCRIPTION OF THE INVENTION

Figure 1:
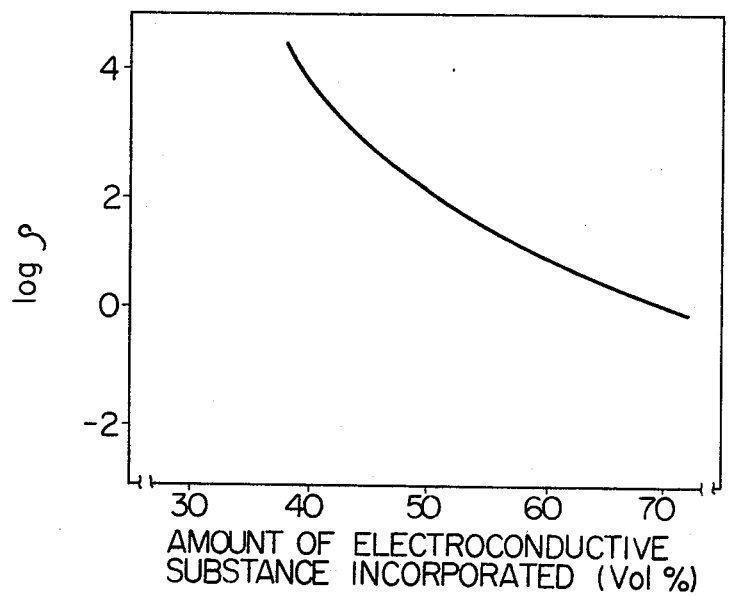
FIG. 1 is a graph showing a relation between the specific electric resistance and the amount of an electroconductive substance incorporated in the composite ceramics of the present invention in the case of using negatively thermally expansive ceramics.

Utilizable as the electroconductive substance of the present invention are, for example, a metal, carbon, a cermet, a metal nitride, a metal boride, a metal carbide, a metal silicide, a metal oxide and a mixture thereof. Illustrative of the metal are, for example, silver, titanium and nichrome. Examples of the cermet include titanium carbide-chromium. Examples of the metal nitride include titanium nitride and aluminum nitride. Examples of the metal boride include titanium boride and zirconium boride. Examples of the metal carbide include silicon carbide and zirconium carbide. Examples of the metal oxide include simple metal oxides such as $ReO_3$ and $RuO_2$; oxygen acid salts of metals such as $LaTiO_3$, $CaMnO_3$, $LaMnO_3$, $CaCrO_3$, $SrCrO_3$, $LaCrO_3$, $LaCoO_3$; $Fe_3O_4$, $NiFe_2O_4$, $La_2NiO_4$ and $La_2CuO_4$; and such compounds as are derived from a metal oxide, for example, $Cu_2O$, $TiO$, $VO$, $MnO$, $CoO$, $NiO$, $ZnO$, $CdO$, $Ti_2O_3$, $V_2O_3$, $Fe_2O_3$, $Cr_2O_3$, $La_2O_3$, $TiO_2$, $SnO_2$; $V_2O_5$, $MnO_3$, $WO_3$ or $ReO_3$ or an oxygen acid salt of a metal or a complex metal oxide, for example, $CaTiO_3$, $SrTiO_3$, $BaTiO_3$, $LaTiO_3$, $LaAlO_3$, $CaMnO_3$; $LaMnO_3$, $CaCrO_3$, $SrCrO_3$, $LaCrO_3$, $LaCoO_3$; $Fe_3O_4$, $NiFe_2O_4$, $La_2NiO_4$, $La_2CoO_4$, $LiFe_5O_8$ or $MgWO_4$ by rendering the ratio of metal to oxygen in the above compound indefinite to impart electroconductivity thereto.

In the present invention, it is necessary that a phase of the ceramics into which a phase of the electroconductive substance is to be dispersed is composed of low thermally expansive or negatively thermally expansive ceramics or glass ceramics. The term "low thermally expansive ceramics" is used herein to mean those having a thermal expansion coefficient of about $5 \times 10^{-6}$/deg or less.

Mentioned as the low thermally expansive ceramics are (1) ceramics of spodumene or eucryptite series, i.e. ceramics composed of 30 – 80% by weight of $SiO_2$, 10 – 50% by weight of $Al_2O_3$ and/or $Fe_2O_3$ and 0.8 – 25% by weight of $Li_2O_3$, optionally with at least one oxide of Na, K, Mg, Ca, Sr, Ba, Cu, Zn, Cr, Mn, Co, Fe, Ni, Sn and Ti in an external amount not exceeding 15% by weight and a clay, glass or feldspar in an external amount not exceeding 10% by weight, (2) ceramics of aluminum titanate series, i.e. ceramics composed of 40 – 75% by weight of $Al_2O_3$ and 25 – 60% by weight of $TiO_2$, optionally with $Fe_2O_3$ in an external amount not exceeding 30% by weight for promoting the formation of ceramics, and with an oxide of Li, Na, K, Mg, Ca, Sr, Ba, Cu, Zn, Cr, Mn, Co, Ni, Zn or Si, clay, glass or feldspar in an external amount not exceeding 10% by weight for controlling the sintering property of the ceramics, (3) ceramics of cordierite series, i.e. ceramics composed of at least 80% by weight of a total of MgO, $Al_2O_3$ and $SiO_2$ with the proviso that the composition of these MgO, $Al_2O_3$ and $SiO_2$ in terms of a triagonal graph for showing the proportion of a ternary component system is within extents surrounded by six co-ordinates (2 . 33 . 65), (2 . 53 . 45), (20 . 15 . 65), (10 . 55 . 35), (30 . 15 . 55) and (30 . 35 . 35) and optionally containing a clay, glass or feldspar in an external amount not exceeding 10% by weight or oxides of Sn, Ti and Zr in an external amount not exceeding 25% by weight, (4) ceramics of mullite series, i.e. ceramics composed of 40 – 70% by weight of $Al_2O_3$, 25 – 55% by weight of at least one of $SiO_2$ and $TiO_2$ and at least one of oxides of Cr, Mn, Fe, Ca and Ni or a clay, glass or feldspar in an amount not exceeding 25% by weight, and (5) ceramics of zircon series, i.e. ceramics composed of at least 70% by weight of zircon ($ZrO_2$ . $SiO_2$), at most 30% by weight of $SiO_2$ and at most 10% by weight of $ZrO_2$, optionally with a silicate in an amount not exceeding 15% by weight of at least one trivalent metal selected from Fe and Cr, a silicate in an amount not exceeding 15% by weight of at least one bivalent metal selected from Co, Ni, Mn and alkali earth metals, and a clay, glass or feldspar in an amount not exceeding 10% by weight.

As the low thermally expansive glass ceramics there can be mentioned those composed of 40 – 70% by weight of $SiO_2$, 15 – 40% by weight of $Al_2O_3$ and 3 – 17% by weight of $Li_2O$ and incorporated with 2 – 10% by weight of $TiO_2$, $ZrO_2$ or $P_2O_5$ as a nuclus-forming agent and those additionally incorporated with at least one oxide of Na, K, Mg, Ca, Sr, Ba, Cu, Zn, Cr, Mn, Co, Fe, Ni and Sn in an amount not exceeding 10% by weight.

Mentioned on the other hand as the negatively thermally expansive ceramics are (1) ceramics of eucryptite, i.e. ceramics composed of 40 – 65% by weight of $SiO_2$, 20 – 50% by weight of $Al_2O_3$ and 5 – 25% by weight of $Li_2O$, optionally with at least one oxide of Na, K, Mg, Ca, Sr, Ba, Cu, Zn, Cr, Mn, Co, Fe, Ni, Sn and Ti in an external amount not exceeding 15% by weight for controlling the sintering property of the ceramics, and a clay, glass or feldspar in an external amount not exceeding 10% by weight, and (2) ceramics of aluminum titanate series, i.e. ceramics composed of 40 – 75% by weight of $Al_2O_3$ and 25 – 60% by weight of $TiO_2$, optionally with $Fe_2O_3$ in an external amount not exceeding 30% by weight for promoting the formation of the ceramics, an oxide of Li, Na, K, Mg, Ca, Sr, Ba, Cu, Zn, Cr, Mn, Co, Ni or Si in an external amount not exceeding 5% by weight for controlling the sintering property of the ceramics.

Mentioned as the negatively thermally expansive ceramics are those composed of 40 – 70% by weight of $SiO_2$, 15 – 40% by weight of $Al_2O_3$ and 3 – 17% by weight of $Li_2O$ and incorporated with 2 – 10% by weight of $TiO_2$, $ZrO_2$ or $P_2O_5$ as a nucleus-forming agent and those additionally incorporated with at least one oxide of Na, K, Mg, Ca, Sr, Ba, Cu, Zn, Cr, Mn, Co, Fe, Ni and Sn in an amount not exceeding 5% by weight.

The low thermally expansive, electroconductive composite ceramics of the present invention can be produced by mixing the low thermally expansive ceramics powder or the negative thermally expansive ceramics powder with the electroconductive substance powder in a given proportion or mixing the above mentioned ceramics powder with a solution of a salt capable of being converted on baking into an electroconductive substance, if necessary, adding to the mixture a clay, feldspar and the like, adding a binder such as carboxymethylcellulose or polyvinyl alcohol to the mixture, shaping it into a desired form and thereafter baking the shaped article. The baking temperature varies according to the sort of materials used and a composition thereof but is usually within a range of 900° – 1600° C.

The low thermally expansive, electroconductive composite glass ceramics of the present invention can be produced by mixing starting materials for forming the glass ceramics in a given proportion, adding an electroconductive substance powder to the mixture, heating it at 1300° – 1700° C to effect glass fusion of the mixture, shaping it into a desired form and thereafter subjecting the shaped article to a thermal treatment conducted at 700° – 900° C.

In the present invention, the proportion of the electroconductive substance to the above mentioned ceramics or glass ceramics should be so defined that the amount of the electroconductive substance is sufficient enough to attain dispersion into the final composite ceramics substantially in continuous state, or in other words, to permit dispersion of the electroconductive substance into the ceramics mutually at least partly in continuous state. The electroconductive substance is present preferably in an amount of at least 10% by volume, more preferably within an extent of 20 – 70% by volume based on the total amount of the electroconductive substance and the ceramics or glass ceramics.

In the present invention, the electroconductive composite ceramics having a desired thermal expansion coefficient ($\alpha$) can be obtained by varying the proportion of the electroconductive substance to the ceramics or glass ceramics. Preferable low thermally expansive, electroconductive composite ceramics usually have an $\alpha$ value of at most $6 \times 10^{-6}$/deg but such value cannot be obtained merely by an arithmetic mean of both ingredients. This is due to the reason that (a) a third phase other than the both ingredients is formed and gives an influence on the thermal expansion coefficient of the whole composite ceramics and (b) in case one of the ingredients is present in a very larger amount, the crystalline particles of the major ingredient forms a continuous phase but those of the minor ingredient forms a non-continuous phase with the result that the major ingredient contributes chiefly to the thermal expansion coefficient of the whole composite ceramics.

Consequently, the proportion of the ingredients in the present invention can be calculated according to the equation given hereunder.

When the thermal expansion coefficient of the desired electroconductive composite ceramics, the thermal expansion coefficient of the electroconductive substance, the thermal expansion coefficient of the ceramics and the amount of the electroconductive substance mixed are represented by $\alpha$, $\alpha_1$, $\alpha_2$ and $x\%$ by volume, respectively, the following relation exists:

$$0 < x \leq 50 \quad \alpha = \alpha_1 + (x/50)^2 \cdot \Delta\alpha/2 \quad (1)$$

$$50 < x < 100 \quad \alpha = \alpha_2 - (100 - x/50)^2 \cdot \Delta\alpha/2 \quad (2)$$

In the above equations, $\Delta\alpha$ stands for the absolute value of a difference between $\alpha_1$ and $\alpha_2$.

The proportions of the ingredients in the present invention calculated according to the above equations are concretely shown in Table 1 below wherein X stands for the amount of the electroconductive substance in terms of % by volume.

Table 1

| Electro-conductive substances | Thermal expansion coefficient of the composite ceramics | | |
|---|---|---|---|
| | Ceramics | | |
| | $\alpha \leq 3$ | $\alpha \leq 6$ | |
| | $Y_1$ | $Y_2$ | $y_3$ |
| $X_1$ | $x \leq 65$ | $x \leq 95$ | $x \leq 95$ |
| $X_2$ | $x \leq 55$ | $x \leq 55$ | $x \leq 45$ |
| $X_3$ | $x \leq 35$ | $x \leq 40$ | — |

Electroconductive substances:

$X_1$ : niobium oxides, vanadium oxides, tin oxides, zirconium boride, carbon, titanium boride, silicon carbide, aluminum nitride and the like $X_2$ : titanium carbide, nichrome, metallic titanium, molybdenum silicide, thoria, titania, titanium nitride, lanthanum chromite, metallic palladium, zirconia, magnetite and the like $X_3$ : stainless steel, silver and the like Ceramics:

$Y_1$ : ceramics of eucryptite series, ceramics of aluminum titanate series and the corresponding glass ceramics and the like $Y_2$ : Ceramics of spodumene series, ceramics of aluminum titanate series, ceramics of cordierite series and the corresponding glass ceramics and the like $Y_3$ : ceramics of mullite series and zircon ceramics.

Known conventional ceramics show a non-linear change in electroconductivity to temperatures and have a large negative electroconductivity at a temperature up to several hundred degrees C. Contrary to this, the composite ceramics of the present invention can be furnished with a linear electroconductivity and either positive or negative electroconductivity temperature characteristics by suitably selecting the sort of electroconductive substances to be incorporated into the ceramics. Thus, the composite ceramics of the present invention can be utilized for various applications over a wide range of temperatures and processed to a safe heat-generating element which is easy in control of temperatures.

The composite ceramics of the present invention can be baked, if necessary, to have a dense structure and thus are excellent in thermal impact-resistance, mechanical strength, high temperature chemical-resisting property and thermal conductivity.

Because of good electroconductivity as described above, the composite ceramics of the present invention are useful for the production of (1) heaters, (2) electrodes in the field of chemical industry, for example, electrodes for electrolytic oxidation of organic materials, (3) instruments for removing electric charge, for example, frictional guides for running threads or tapes and frictional assemblies for rotation and (4) thermisters. As the composite ceramics are low thermally expansive, they are especially suitable for the use encountering repeated rapid heating and cooling, for example, heaters for cooking or electrodes exposed to rapid changes of temperatures.

In case the composite ceramics are used as a heater element, infra-red heat rays are radiated, thus making the composite ceramics suitable for dehydration, evaporation of organic solvents, baking of resins, drying of resins, fibers, metals and medicaments. In these cases, the composite ceramics can be worked up to a ceramic heater where a heater element and a support thereof are integrated. Accordingly, the composite ceramics of the present invention can be processed to have a simple structure, as compared with a heater using nichrome or molybdenum silicide.

To further illustrate this invention, and not by way of limitation, the following examples are given.

EXAMPLE 1

42.4 Parts by weight of silica powder, 31.0 parts by weight of alumina powder, 23.9 parts by weight of lithium carbonate powder and 0.3 part by weight of magnesium carbonate powder were thoroughly mixed and the mixture was calcined at 1200° C and then pulverized whereby a ceramics powder composed of 49.5% by weight of $SiO_2$, 36.2% by weight of $Al_2O_3$, 2.8% by weight of $Fe_2O_3$, 11.3% by weight of $Li_2O$ and 0.2% by weight of $MgO$ was prepared.

Separately, a powdery mixture of 3.0% by weight of NiO and 97.0% by weight of $Fe_2O_3$ was calcined at 1300° C in a stream of nitrogen and then pulverized whereby an electroconductive substance was prepared.

The ceramics powder was mixed with the electroconductive substance powder in various proportions and the mixture was incorporated with a clay in an amount of 1% by weight based on the total amount, wet mixed in a ball mill and then baked for one hour at 1250° C under weakly reducing conditions.

Figure 2:
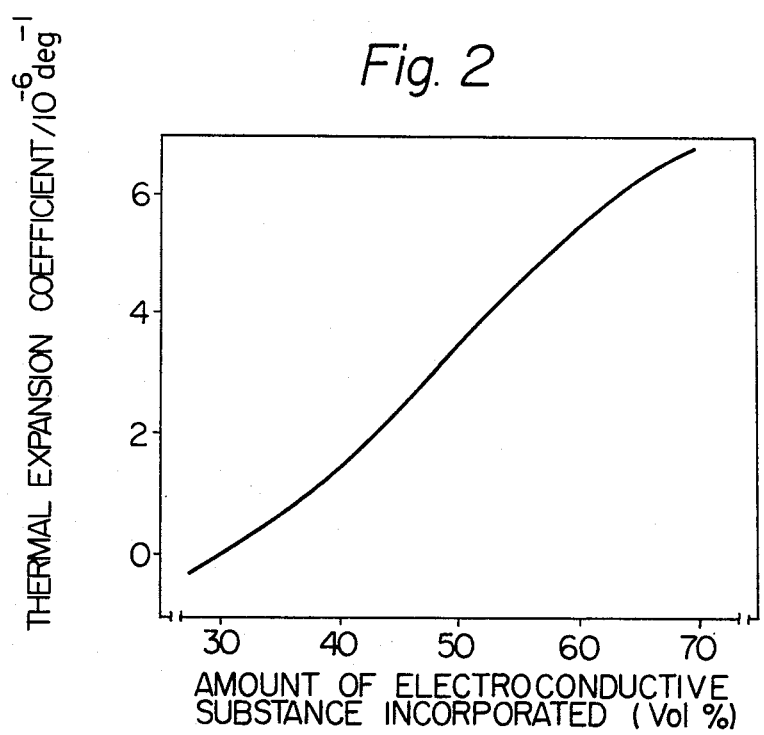
FIG. 2 is a graph showing a relation between the amount of an electroconductive substance incorporated and the thermal expansion coefficient.

A relation between the specific electric resistance and the amount of the electroconductive substance incorporated in the resulting composite ceramics is graphically shown in FIG. 1 and a relation between the amount of the electroconductive substance incorporated and the thermal expansion coefficient in the composite ceramics is graphically shown in FIG. 2.

Figure 3:
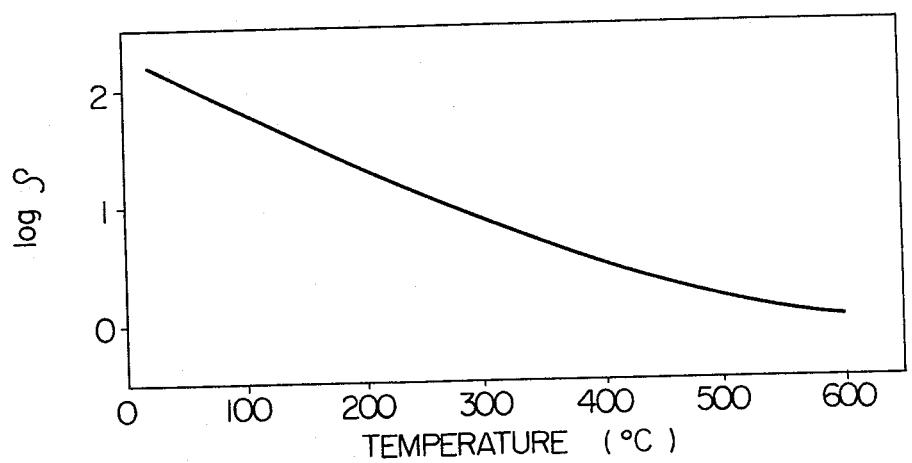
FIG. 3 is a graph showing a relation between the temperature and the specific electric resistance.

A relation between the temperature and the specific electric resistance in the case of the amount of the electroconductive substance incorporated being 50% by volume is graphically shown in FIG. 3.

EXAMPLE 2

The same ceramic powder as described in Example 1 was mixed with various electroconductive substances and the mixtures were incorporated with a clay in an amount of 1% by weight based on the total amount and then baked for one hour at 950° – 1350° C in the open air or a reducing atmosphere whereby conposite ceramics were obtained. The result is shown in Table 2 below.

Table 2

| Sample No. | Electroconductive substance Sort | Electroconductive substance Amount incorporated (vol %) | Baking condition Baking temperature (° C) | Baking condition Atmosphere | Characteristics Thermal expansion coefficient ($\times 10^{-6}$/deg) | Characteristics Specific electric resistance (normal temperature) ($\Omega \cdot cm$) | Characteristics Temperature characteristics of specific electric resistance (deg$^{-1}$) |
|---|---|---|---|---|---|---|---|
| 1 | Ag | 25 | 950–1020 | air | +0.5 | $4.8 \times 10^{-1}$ | $+4.6 \times 10^{-4}$ |
| 2 | Ti | 50 | 1300–1350 | vacuum | +1.3 | 1.2 | $+2.4 \times 10^{-4}$ |
| 3 | TiN | 55 | 1300–1350 | $N_2$ | +1.8 | $8.7 \times 10^{-1}$ | $+6.3 \times 10^{-4}$ |
| 4 | SiC | 60 | 1300–1350 | air | +0.42 | $1.4 \times 10^2$ | $-7.6 \times 10^{-4}$ |
| 5 | C | 40 | 1300–1350 | $N_2$ | −1.5 | $7.3 \times 10$ | $-1.2 \times 10^{-4}$ |

EXAMPLE 3

Using the same ceramics powder as described in Example 1, 93% by weight of the powder having a particle diameter of about 1 mm was blended with 5% by weight of the powder passing through a sieve of 325 mesh and 2% by weight of a clay. The mixture was thoroughly mixed, shaped and baked at 1250° C to produce a porous ceramics body which was then added gently to metallic silver molten under vacuum. Electroconductive ceramics thus obtained have the following characteristic properties:

Thermal expansion coefficient; $-1.8 \times 10^{-6}$/deg
Specific electric resistance (normal temperature); $2.4 \times 10^{-2} \Omega.cm$
Temperature characteristics of the specific electric resistance; $5.1 \times 10^{-4}$/deg

EXAMPLE 4

A porous ceramics body was produced in the same manner as described in Example 3 except that the baking temperature was 1200° C. The porous ceramics body was impregnated with a tar and then baked at 850° C to carbonize the tar. Electroconductive ceramics thus obtained have the following characteristic properties:

Thermal expansion coefficient; $-2.5 \times 10^{-6}$/deg
Specific electric resistance (normal temperature); 6.4 $\Omega.cm$
Temperature characteristics of the specific electric resistance; $-9.8 \times 10^{-5}$/deg

EXAMPLE 5

A powdery mixture of 38.8% by weight of $TiO_2$, 10.5% by weight of $Fe_2O_3$ and 50.7% by weight of $Al_2O_3$ was thoroughly mixed, calcined at 1300° C and pulverized to produce a ceramic powder. The ceramic powder was incorporated with various kinds of electroconductive substance powder and with feldspar in an amount of 2% by weight based on the total amount and the resultant mixtures were thoroughly mixed, shaped and then baked at 950° – 1600° C in the open air or in a reducing atmosphere to produce electroconductive ceramics. The result is shown in Table 3 below.

Table 3

| Sample No. | Electroconductive substance Sort | Electroconductive substance Amount incorporated (vol %) | Baking condition Baking temperature (° C) | Baking condition Atmosphere | Characteristics Thermal expansion coefficient ($\times 10^{-6}$/deg) | Characteristics Specific electric resistance (normal temperature) ($\Omega \cdot cm$) | Characteristics Temperature characteristics of specific electric resistance (deg$^{-1}$) |
|---|---|---|---|---|---|---|---|
| 1 | Ag | 25 | 950–1020 | air | +1.6 | $6.8 \times 10^{-1}$ | $+4.1 \times 10^{-4}$ |
| 2 | Ti | 50 | 1500–1600 | vacuum | +2.6 | 2.8 | $+2.9 \times 10^{-4}$ |
| 3 | TiN | 50 | 1450–1550 | $N_2$ | +2.9 | 1.6 | $+4.8 \times 10^{-4}$ |
| 4 | SiC | 55 | 1450–1550 | $N_2$ | +1.2 | $4.7 \times 10$ | $-7.8 \times 10^{-4}$ |
| 5 | C | 45 | 1450–1550 | $N_2$ | +0.7 | $3.3 \times 10$ | $-9.3 \times 10^{-5}$ |

EXAMPLE 6

Powdery starting materials were mixed so that the mixture might be composed of 68% by weight of $SiO_2$, 18% by weight of $Al_2O_3$, 7% by weight of $Li_2O$ and 7% by weight of $TiO_2$ and additionally blended with MgO in an external amount of 1.5% by weight was incorporated with various kinds of electroconductive substance powder and the resultant mixtures were thoroughly mixed and subjected to glass fusion at 1600° C to shape the mixtures. The shaped articles were then subjected to a heat treatment conducted at 800° – 900° C to produce glass ceramics. The characteristic properties of the glass ceramics thus obtained are shown in Table 4.

Table 4

| Sample No. | Electroconductive substance powder incorporated Sort | Electroconductive substance powder incorporated Amount incorporated (vol %) | Thermal expansion coefficient ($\times 10^{-6}$/deg) | Specific electric resistance (normal temperature) ($\Omega \cdot cm$) | Temperature characteristics of specific electric resistance (deg$^{-1}$) |
|---|---|---|---|---|---|
| 1 | Ag | 30 | + 2.5 | 1.3 | $+4.3 \times 10^{-4}$ |
| 2 | Ti | 55 | + 2.6 | $3.7 \times 10$ | $+2.1 \times 10^{-4}$ |

EXAMPLE 7

55.0 Parts by weight of silica powder, 24.0 parts by weight of alumina powder, 4.5 parts by weight of ferric oxide powder, 14.5 parts by weight of lithium carbonate powder and 2.0 parts by weight of potassium carbonate powder were thoroughly mixed and the mixture was calcined at 1100° C and pulverized whereby a ceramics powder composed of 60.6% by weight of $SiO_2$, 26.4% by weight of $Al_2O_3$, 5.0% by weight of $Fe_2O_3$, 6.5% by weight of $Li_2O$ and 1.5% by weight of $K_2O$ was prepared.

Separately, a powdery mixture of 3.0% by weight of NiO and 97.0% by weight of $Fe_2O_3$ was calcined at 1300° C in a stream of nitrogen and then pulverized whereby an electroconductive substance was prepared.

The ceramics powder was mixed with the electroconductive substance powder in various proportions and the mixture was incorporated with a clay in an amount of 1% by weight based on the total amount, wet mixed in a ball mill and then baked for one hour at 1100° C under weakly reducing conditions.

Figure 4:
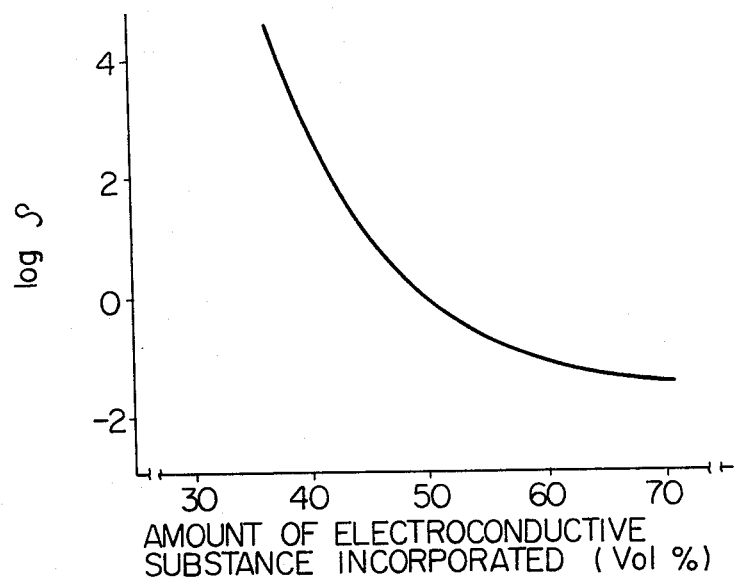
FIG. 4 is a graph showing a relation between the specific electric resistance and the amount of an electroconductive substance incorporated in the composite ceramics of the present invention in the case of using low thermally expansive ceramics.
Figure 5:
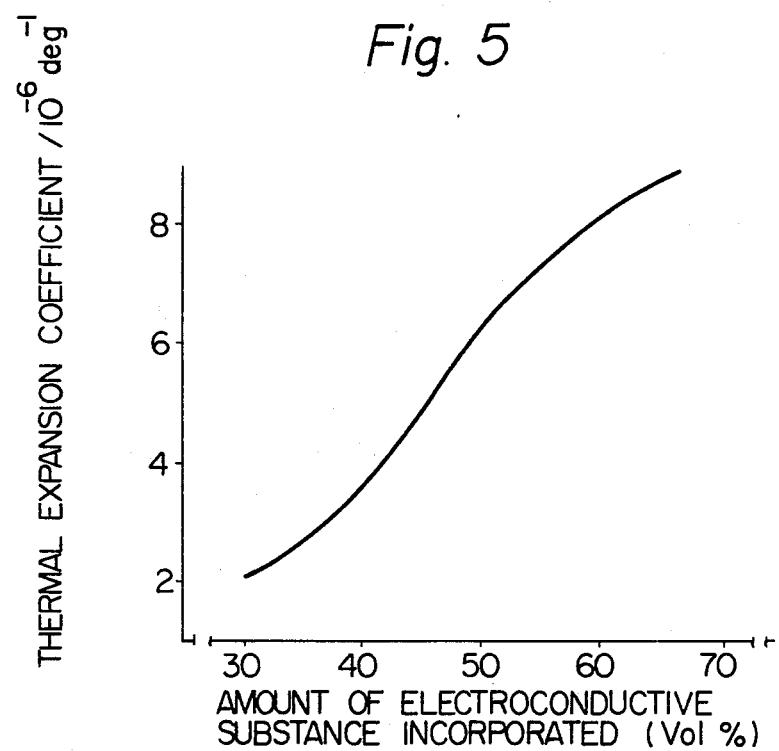
FIG. 5 is a graph showing a relation between the amount of an electroconductive substance incorporated and the thermal expansion coefficient.

A relation between the amount of the electroconductive substance incorporated and the specific electric resistance in the resulting composite ceramics is graphically shown in FIG. 4 and a relation between the amount of electroconductive substance incorporated and the thermal expansion coefficient in the composite ceramics is graphically shown in FIG. 5.

Figure 6:
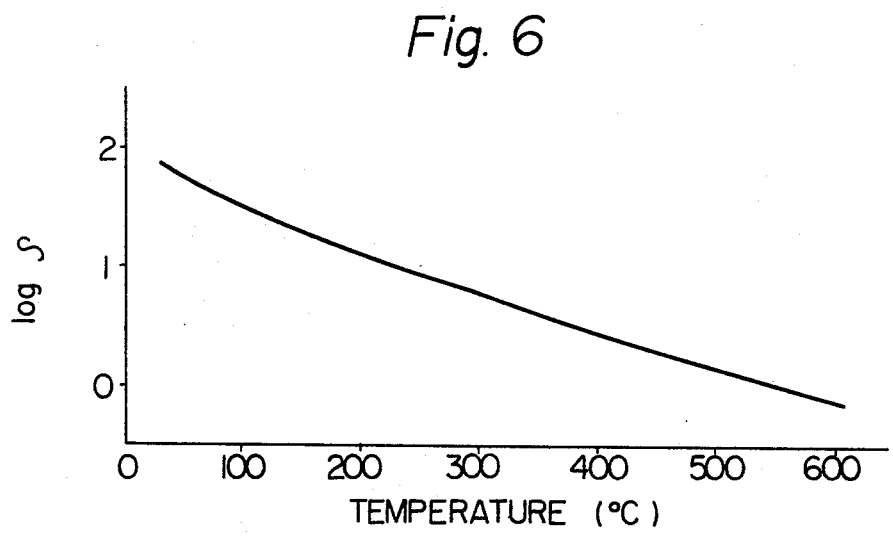
FIG. 6 is a graph showing a relation between the temperature and the specific electric resistance.

A relation between the temperature and the specific electric resistance in the case of the amount of the electroconductive substance incorporated being 50% by volume is also shown graphically in FIG. 6.

EXAMPLE 8

The same ceramics powder as described in Example 1 was mixed with various electroconductive substances and the mixtures were incorporated with a clay in an amount of 1% by weight based on the total amount and then baked for one hour at 900° – 1150° C in the open air or a reducing atmosphere whereby composite ceramics were obtained. The result is shown in Table 5.

mixed, shaped and then baked at 950°–1600° C in the open air or in a reducing atmosphere to produce electroconductive ceramics. The result is shown in Table 6.

Table 6

| Sample No. | Electroconductive substance | | Baking condition | | Characteristics | | |
|---|---|---|---|---|---|---|---|
| | Sort | Amount incorporated (vol %) | Baking temperature (° C) | Atmosphere | Thermal expansion coefficient ($\times 10^{-6}$/deg) | Specific electric resistance (normal temperature) ($\Omega \cdot cm$) | Temperature characteristics of specific electric resistance ($deg^{-1}$) |
| 1 | Ag | 25 | 950–1020 | air | +2.6 | $4.3 \times 10^{-1}$ | $+4.1 \times 10^{-4}$ |
| 2 | Ti | 45 | 1500–1600 | Vacuum | +3.5 | $8.7 \times 10^{-1}$ | $+2.9 \times 10^{-4}$ |
| 3 | TiN | 50 | 1450–1550 | $N_2$ | +3.9 | 1.2 | $+4.8 \times 10^{-4}$ |
| 4 | SiC | 55 | 1450–1550 | $N_2$ | +2.2 | $7.2 \times 10$ | $-7.8 \times 10^{-4}$ |
| 5 | C | 45 | 1450–1550 | $N_2$ | +2.0 | $7.4 \times 10$ | $-9.3 \times 10^{-5}$ |

EXAMPLE 10

A clay, magnesium carbonate, a small amount of ferric oxide, an alkali earth metal oxide (RO), an alkali metal oxide ($R'_2O$) and the like were well mixed and the mixture was calcined for one hour at 1250° C and then finely pulverized to produce a ceramics powder. The powder was cordierite of which the chemical composition in terms of % by weight was as shown below.

MgO 20.8, $Al_2O_3$ 21.2, $SiO_2$ 58.0, $Fe_2O_3$ 0.07, RO 0.12 and $R'_2O$ 0.38

The ceramics powder was incorporated with various kinds of electroconductive substance powder and the mixture were thoroughly mixed, shaped and then baked at 950° – 1400° C in the open air or a reducing atmosphere to produce electroconductive ceramics. The result was as shown in Nos. 1 and 2 in Table 7.

EXAMPLE 11

Homogeneously mixed starting materials were calcined for one hour at 1250° C and then finely pulverized to produce a ceramics powder. The powder was mullite of which the chemical composition in terms of % by weight was as shown below.

$Al_2O_3$ 68, $SiO_2$ 27 and $Fe_2O_3$ 5.0

The ceramics powder was incorporated with various kinds of electroconductive substance powder and the mixtures were thoroughly mixed, shaped and then baked at 950° – 1400° C in the open air or a reducing Table 5

| Sample No. | Electroconductive substance | | Baking condition | | Characteristics | | |
|---|---|---|---|---|---|---|---|
| | Sort | Amount incorporated (vol %) | Baking temperature (° C) | Atmosphere | Thermal expansion coefficient ($\times 10^{-6}$/deg) | Specific electric resistance (normal temperature) ($\Omega \cdot cm$) | Temperature characteristics of specific electric resistance ($deg^{-1}$) |
| 1 | Ag | 25 | 950–980 | air | 2.5 | $3.0 \times 10^{-1}$ | $+4.3 \times 10^{-4}$ |
| 2 | Ti | 50 | 1100–1150 | Vacuum | 4.1 | 2.4 | $+2.5 \times 10^{-4}$ |
| 3 | TiN | 55 | 1100–1150 | $N_2$ | 4.8 | $6.4 \times 10^{-1}$ | $+6.3 \times 10^{-4}$ |
| 4 | SiC | 60 | 1100–1150 | air | 3.4 | $2.0 \times 10^2$ | $-7.4 \times 10^{-4}$ |
| 5 | C | 40 | 1100–1150 | $N_2$ | 2.8 | $7.3 \times 10$ | $-1.2 \times 10^{-4}$ |
| 6 | $MoSi_2$ | 55 | 1100–1150 | Vacuum | 4.6 | $8.7 \times 10^{-1}$ | $+3.7 \times 10^{-3}$ |

EXAMPLE 9

A powdery mixture of 40.0% by weight of $TiO_2$, 12.0% by weight of $Fe_2O_3$ and 48.0% by weight of $Al_2O_3$ was thoroughly mixed, calcined at 1300° C and pulverized to produce a ceramics powder. The ceramics powder was incorporated with various kinds of electroconductive substance powder and with feldspar in an amount of 2% by weight based on the total amount and the resultant mixtures were thoroughly atmosphere to produce electroconductive ceramics. The result was as shown in Nos. 3 and 4 in Table 7.

EXAMPLE 12

Thoroughly mixed starting materials were calcined for 2 hours at 1420° C and then finely pulverized to produce a ceramics powder. The powder was zircon of which the chemical composition in terms of % by weight was as shown below.

$SiO_2$ 32.5, $ZrO_2$ 62.8 and $Fe_2O_3$ 4.7

The ceramics powder was incorporated with various kinds of electroconductive substance powder and the mixtures were thoroughly mixed, shaped and then baked at 950° – 1450° C in the open air or in a reducing atmosphere to produce electroconductive ceramics. The result was as shown in Nos. 5 and 6 in Table 7.

Table 7

| Sample No. | Electroconductive substance | | Baking condition | | Characteristics | | |
|---|---|---|---|---|---|---|---|
| | Sort | Amount incorporated (vol %) | Baking temperature (° C) | Atmosphere | Thermal expansion coefficient ($\times 10^{-6}$/deg) | Specific electric resistance (normal temperature) ($\Omega \cdot cm$) | Temperature characteristics of specific electric resistance ($deg^{-1}$) |
| 1 | Pd | 30 | 1300–1350 | air | 4.2 | $8.4 \times 10^{-1}$ | $4.5 \times 10^{-4}$ |
| 2 | SiC | 55 | 1350–1400 | $N_2$ | 3.6 | $6.1 \times 10$ | |
| 3 | Pd | 30 | 1350–1400 | air | 4.8 | $6.0 \times 10^{-1}$ | $3.7 \times 10^{-4}$ |
| 4 | SiC | 55 | 1400–1450 | $N_2$ | 4.3 | $4.7 \times 10$ | $-7.1 \times 10^{-4}$ |
| 5 | Pd | 30 | 1350–1400 | air | 4.5 | $2.3 \times 10^{-1}$ | $4.1 \times 10^{-4}$ |
| 6 | SiC | 55 | 1400–1450 | $N_2$ | 4.0 | $9.8 \times 10$ | $-7.5 \times 10^{-4}$ |

EXAMPLE 13

Powdery starting materials were mixed so that the mixture might be composed of 72% by weight of $SiO_2$, 17% by weight of $Al_2O_3$, 4% by weight of $Li_2O$ and 7% by weight of $TiO_2$ and additionally blended with MgO in an external amount of 1.5% by weight was incorporated with various kinds of electroconductive substance powder and the resultant mixtures were thoroughly mixed and subjected to glass fusion at 1600° C to shape the mixtures. The shaped articles were then subjected to a heat treatment conducted at 800° – 900° C to produce glass ceramics. The characteristic properties of the glass ceramics thus obtained are shown in Table 8.

Table 8

| Sample No. | Electroconductive substance Powder incorporated | | Thermal expansion coefficient ($\times 10^{-6}$/deg) | Specific electric resistance (normal temperature) ($\Omega \cdot cm$) | Temperature characteristics of specific electric resistance ($deg^{-1}$) |
|---|---|---|---|---|---|
| | Sort | Amount incorporated (vol %) | | | |
| 1 | Pd | 30 | +3.0 | 1.3 | $+4.3 \times 10^{-4}$ |
| 2 | Ti | 55 | +3.4 | $3.7 \times 10$ | $+2.1 \times 10^{-4}$ |

It is understood that the preceding representative examples may be varied within the scope of the present specification, both as to ingredients and treatment conditions, by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

What is claimed is:

1. A low thermally expansive, electroconductive composite sintered ceramic comprising a phase of at least one ceramic selected from the group consisting of
   (a) low thermally expansive ceramics selected from the group consisting of spodumene series ceramics, eucryptite series ceramics, aluminium titanate series ceramics, cordierite series ceramics, mullite series ceramics and zircon series ceramics having a thermal expansion coefficient of about $5 \times 10^{-6}$/degree or less and
   (b) negatively thermally expansive ceramics selected from the group consisting of eucryptite series ceramics and aluminium titanate ceramics and
   said sintered ceramic having dispersed therein at least 10% by volume of a phase of $NiFe_2O_4$ substantially in a continuous state.

* * * * *